(No Model.)
J. H. JOHNSON.
HAY STACKER.
No. 293,031. Patented Feb. 5, 1884.
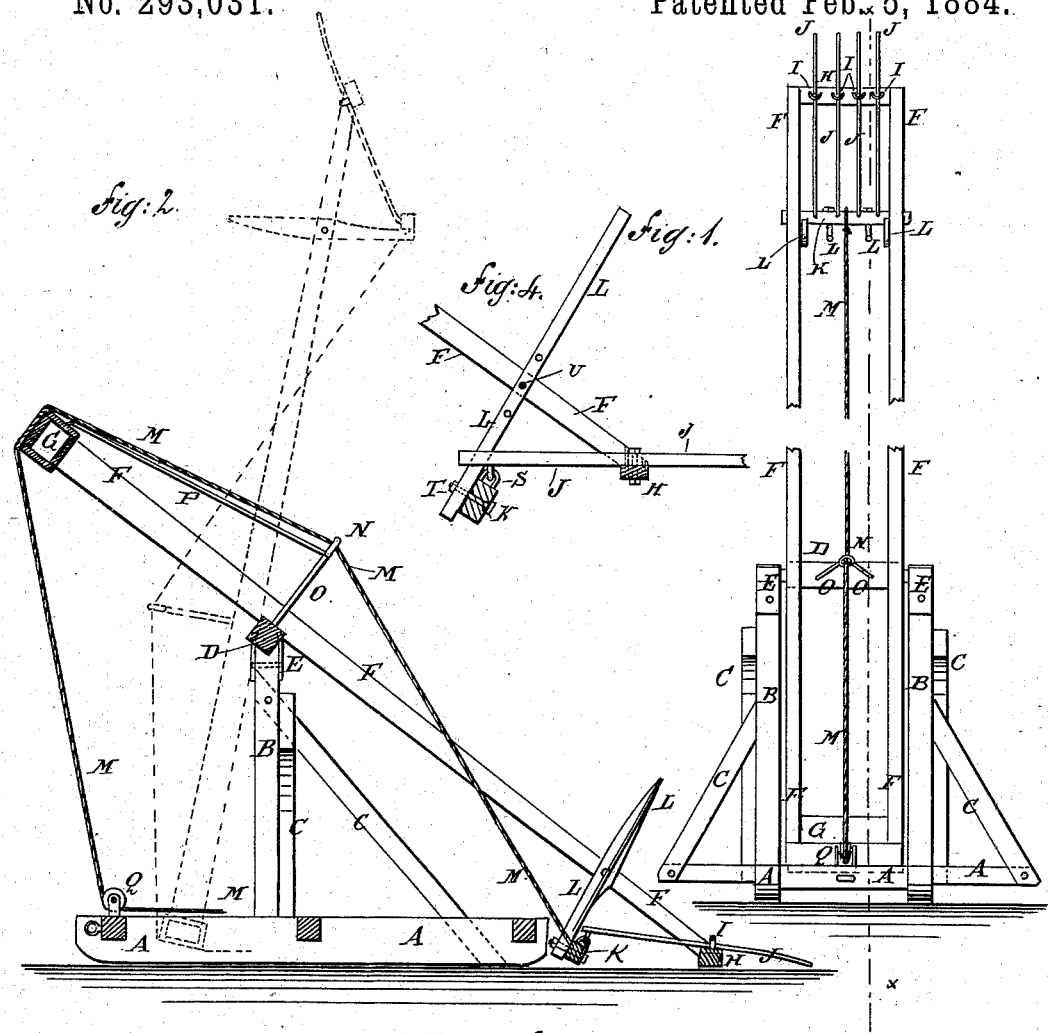
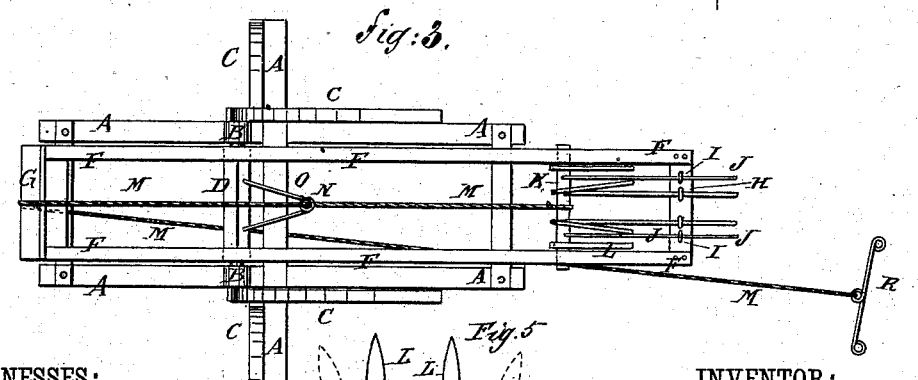
WITNESSES:
INVENTOR:
J. H. Johnson
BY
ATTORNEYS.

UNITED STATES PATENT OFFICE.

JAMES HENERY JOHNSON, OF GREENCASTLE, MISSOURI.

HAY-STACKER.

SPECIFICATION forming part of Letters Patent No. 293,031, dated February 5, 1884.

Application filed October 15, 1883. (No model.)

*To all whom it may concern:*

Be it known that I, JAMES HENERY JOHNSON, of Greencastle, in the county of Sullivan and State of Missouri, have invented a new and useful Improvement in Hay-Stackers, of which the following is a full, clear, and exact description.

Reference is to be had to the accompanying drawings, forming a part of this specification, in which similar letters of reference indicate corresponding parts in all the figures.

Figure 1 is a rear elevation of my improvement shown in position for discharging the hay. Fig. 2 is a longitudinal vertical section of the same, taken through the line $x\,x$, Fig. 1, shown in full lines in position to receive the hay and in dotted lines in position to discharge the hay. Fig. 3 is a plan view of the same shown in position to receive the hay. Fig. 4 is a sectional elevation of the rake-head, illustrating the construction. Fig. 5 is a detail rear view thereof.

The object of this invention is to facilitate the operation of stacking hay.

The invention consists of the several combinations and arrangements of parts, substantially as hereinafter fully set forth and claimed.

A represents the base-frame of the machine, the ends of the side bars of which are beveled or rounded, as shown in Figs. 1 and 2, to adapt the said side bars to serve as runners when moving the machine from place to place.

To the side bars of the base-frame A, a little in the rear of their centers, are attached the lower ends of two standards, B, which are firmly secured in position and strengthened by braces C. The upper ends of the braces C are attached to the upper parts of the standards B, and their lower ends are attached to the side bars and the projecting ends of the central cross-bar of the base-frame A.

In the upper ends of the standards B are formed half-bearings, to receive the journals of the shaft D, which is kept in place by straps E passing over the said journals and attached to the said standards.

To the rock-shaft D, near its ends, are attached the side bars of the fork frame or handle F at points in the rear of the centers of the said side bars. The rear ends of the side bars of the fork-handle F are connected by a box, G, to receive sand or other suitable substance to form a balancing-weight. The forward ends of the side bars of the fork-handle are beveled, and to them are attached the ends of a cross-bar, H, to which are secured, by staples I or other suitable means, four or more prongs, J. The rear ends of the prongs J are hinged by staples S or other suitable means to a cross-bar, K, which serves as a fork-head, and to which are also attached the lower ends of the delivery-prongs L. The two middle receiving-prongs are placed at such a distance apart that the horse that draws the hay-cocks upon the said receiving-prongs J can walk between the said middle prongs. The delivery-prongs L have their lower ends secured to the fork-head K by bolts T, so that the upper parts of the two middle prongs can be swung outward to allow the horse to pass between them, or can be pushed outward by the passage of the said horse. The two middle prongs, L, can be moved back by the attendant to their proper position after the horse has passed and before the hay-cock has been drawn upon the fork. The outer prongs, L, are secured to the side bars of the handle-frame F by bolts U, to give firmness and strength to the fork. Several holes can be formed in the side prongs, L, to receive the bolts U, so that the fork-head can be adjusted to regulate the pitching as may be desired.

To the center of the fork-head K is attached the end of a rope, M, which passes through a guide-eye, N, attached to or formed in the angle of the V-shaped standard O, which is strengthened in position by a brace, P, attached at one end to the angle of the standard O and at the other end to the rear end of the fork-handle F. The ends of the V-shaped standard O are attached to the end parts of the rock-shaft D.

From the guide-eye N the rope M passes over the rear end of the fork-handle F, around a guide-pulley, Q, pivoted to a support attached to the rear cross-bar of the base-frame A, and forward above the said base-frame and below the fork, and has a whiffletree, R, attached to its forward end for the convenient attachment of the draft-animal.

In applying my improvement to practical use, the machine is drawn to the side of the stack, and the hay-cocks are drawn upon the receiving-prongs of the fork by a horse passing between the prongs of the forks, in the manner hereinbefore described, and passing out at the rear end of the machine. The horse attached to the whiffletree R is then started, and the action of the rope M upon the rear end of the fork-handle F turns the rock-shaft D, raises the loaded fork into an upright position, and discharges the hay upon the stack. As the hoisting-rope M is slackened, the fork returns by its own weight to its former position, ready to receive another hay-cock.

Having thus described my invention, I claim as new and desire to secure by Letters Patent—

1. In a hay-stacker, the combination, with the base-frame A and standards B, of the pivoted handle F, with its axis supported upon the standard, the prongs J and L, loosely connected together, the prongs L having adjusting-apertures, and the hoisting-rope M, substantially as and for the purpose set forth.

2. The combination, with the pivoted handle F of a hay-stacker, of the prongs J and L, the said prongs J and L being loosely connected, and the prongs L being provided with adjusting-apertures, whereby the prongs L may be adjusted relatively to the handle, substantially as shown and described.

3. In a hay-stacker, the combination, with the base-frame A and the standards B, of the fork-handle F, the shaft D, the prongs J L, loosely connected together, the prongs J and the cross-bar H of the handle F, the V-shaped standard O, the brace P, and rope M, substantially as and for the purpose set forth.

4. In a hay-stacker, the combination of the handle F, the end cross-bar, H, provided with staples or eyes I, the head K, and the prongs J L, the prongs J being connected loosely to the head K, and the prongs L being connected to the side bars of the handle F, substantially as and for the purpose set forth.

5. In a hay-stacker, the head K and cross-bar H of the handle F, in combination with the prongs J L, the intermediate or middle ones of the delivery-prongs L being pivoted to the head K, to allow them to be moved wider apart, and the intermediate or middle ones of the receiving-prongs J being disposed sufficiently far apart for the passage of the horse, substantially as set forth.

JAMES HENERY JOHNSON.

Witnesses:
J. E. DORSEY,
W. L. TAYLOR.